(12) United States Patent
Wey et al.

(10) Patent No.: US 10,684,737 B1
(45) Date of Patent: Jun. 16, 2020

(54) IDENTIFYING A TARGET FOR A POINTING DEVICE

(75) Inventors: Claudia Wey, Wayland, MA (US); James G. Owen, Bolton, MA (US)

(73) Assignee: The MathWorks, Inc., Natick, MA (US)

( * ) Notice: Subject to any disclaimer, the term of this patent is extended or adjusted under 35 U.S.C. 154(b) by 1117 days.

(21) Appl. No.: 12/434,286

(22) Filed: May 1, 2009

(51) Int. Cl.
*G06F 3/0481* (2013.01)

(52) U.S. Cl.
CPC ................................ *G06F 3/04812* (2013.01)

(58) Field of Classification Search
CPC .......... G06F 3/04812; G06F 3/04817; G06F 3/0482; G06F 3/0481; G06F 3/04842
USPC .......................................................... 345/157
See application file for complete search history.

(56) References Cited

U.S. PATENT DOCUMENTS

| 4,698,625 | A | * | 10/1987 | McCaskill et al. ........... 345/157 |
| 5,298,890 | A | | 3/1994 | Kanamaru et al. |
| 5,508,717 | A | | 4/1996 | Miller |
| 5,870,079 | A | * | 2/1999 | Hennessy ...................... 345/159 |
| 2002/0075315 | A1 | * | 6/2002 | Scott ............................. 345/802 |

OTHER PUBLICATIONS

"Visual Basic Procedure to Get/Set Cursor," <http://support.microsoft.com/kb/152969>, Microsoft® Support, Microsoft®, Oct. 11, 2006, pp. 1-3.
"Cursor.Position Property: .NET Framework 1.1," MSDN®, <http://msdn.microsoft.com/en-us/library/system.windows.forms.cursor.position(v=vs.71).aspx>, Microsoft®, 2012, Retrieved on Jun. 19, 2012, pp. 1-3.
"Cursor.Position Property: .NET Framework 4," MSDN®, <http://msdn.microsoft.com/en-us/library/system.windows.forms.cursor.position.aspx>, Microsoft®, Sep. 2010, pp. 1-3.

* cited by examiner

*Primary Examiner* — Jeff Piziali
(74) *Attorney, Agent, or Firm* — Cesari and McKenna, LLP

(57) ABSTRACT

In an embodiment, a technique for identifying a target for a pointing device in a display. The technique may involve identifying a trajectory of movement of the pointing device and identifying the target for the pointing device based on at least the identified trajectory. The target may be, for example, a graphical user interface (GUI) element that may be displayed in the display or a location in the display.

22 Claims, 12 Drawing Sheets

IDENTIFYING A TARGET FOR A POINTING DEVICE

BACKGROUND

Modeling environments may include textual modeling environments and/or graphical modeling environments that may be used to generate, compile, and/or execute one or more models that represent systems. Modeling environments may cater to various aspects of dynamic system simulation, synthesis, analysis, and design. Such modeling environments may allow users to perform numerous types of tasks including, for example, constructing and simulating system models.

Some modeling environments contain provisions for displaying tooltips. A tooltip may be graphical user interface (GUI) element (e.g., a window) that may be displayed to provide information about features (e.g., software functions) that may be associated with the modeling environment.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention.

One or more embodiments of the invention may be implemented on one or more computing devices. The one or more computing devices may be a system or part of a system. The one or more computing devices may include a desktop computer, a laptop computer, a client computer, a server computer, a mainframe computer, a personal digital assistant (PDA), a web-enabled cellular telephone, a smart phone, a smart sensor/actuator, or some other computing device.

Figure 1:
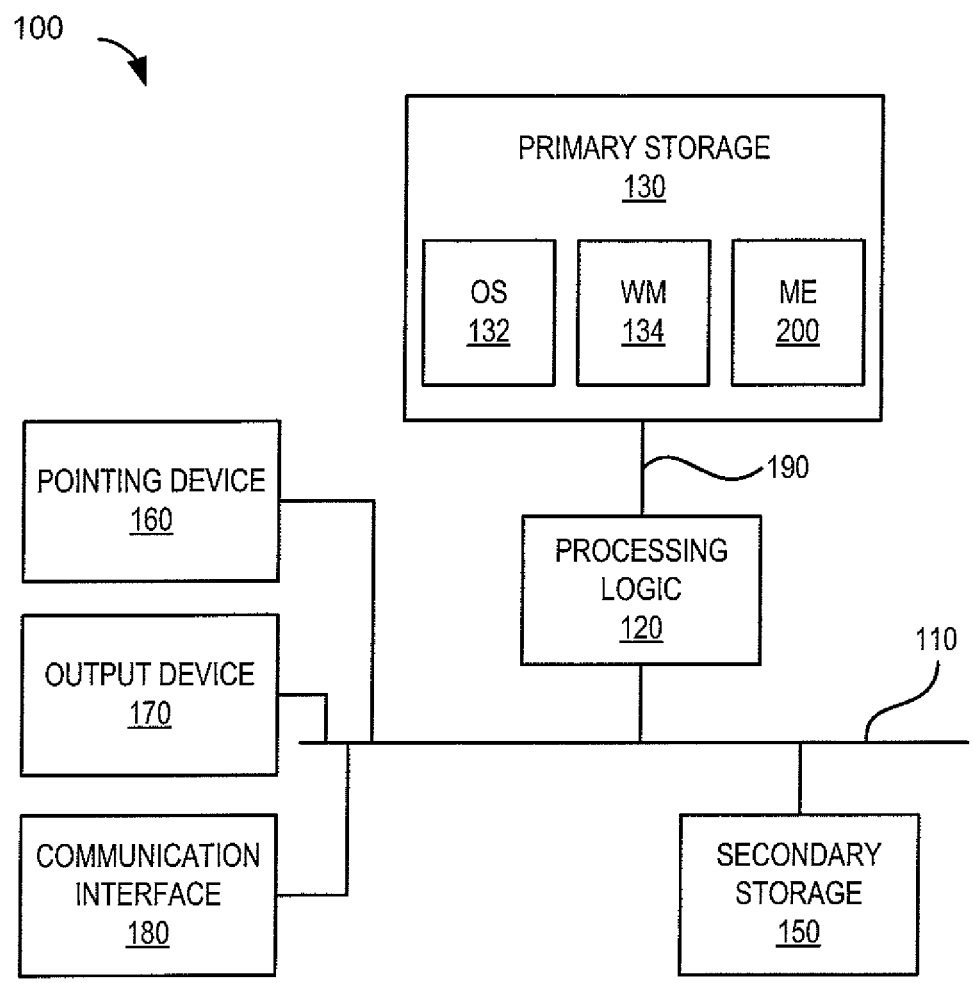
FIG. 1 illustrates an example of a computing device that may be configured to implement one or more embodiments of the invention.

FIG. 1 illustrates an example of a computing device 100 that may be configured to implement one or more embodiments of the invention. Referring to FIG. 1, the computing device 100 may be associated with (e.g., include) one or more components including an input-output (I/O) bus 110, processing logic 120, a primary storage 130, a secondary storage 150, a pointing device 160, an output device 170, a communication interface 180, and a memory bus 190. Note that computing device 100 is an example of a computing device that may be configured to implement one or more embodiments of the invention. It should be noted that other computing devices that may be less complicated or more complicated than computing device 100 may be configured to implement one or more embodiments of the invention.

The I/O bus 110 may be an interconnect bus configured to enable communication among various components in the computing device 100, such as processing logic 120, secondary storage 150, pointing device 160, output device 170, and communication interface 180. The communication may include, among other things, transferring information (e.g., data and control information) between the components.

The memory bus 190 may be an interconnect bus configured to enable information to be transferred between the processing logic 120 and the primary storage 130. The information may include instructions and/or data that may be executed, manipulated, and/or otherwise processed by processing logic 120. The instructions and/or data may include instructions and/or data that are configured to implement one or more embodiments of the invention.

The processing logic 120 may include logic configured to interpret, execute, and/or otherwise process information contained in, for example, the primary storage 130 and/or secondary storage 150. The information may include instructions and/or data configured to implement one or more embodiments of the invention. The processing logic 120 may comprise a variety of heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units, or other types of processing logic that may interpret, execute, manipulate, and/or otherwise process the information. The processing logic 120 may comprise a single core or multiple cores. An example of a processor that may be used to implement processing logic 120 is the Intel® Xeon® processor available from Intel Corporation, Santa Clara, Calif.

The secondary storage 150 may be a computer-readable media that is accessible to the processing logic 120 via I/O bus 110. The secondary storage 150 may be configured to store information for the processing logic 120. The information may be executed, interpreted, manipulated, and/or otherwise processed by the processing logic 120. The secondary storage 150 may comprise, for example, a storage device, such as a magnetic disk, optical disk, random-access memory (RAM) disk, flash drive, etc. The information may be stored on one or more computer-readable media contained in the storage device. Examples of media that may be contained in the storage device may include magnetic discs, optical discs, and memory devices (e.g., flash memory devices, static RAM (SRAM) devices, dynamic RAM (DRAM) devices, or other memory devices). The information may include data and/or computer-executable instructions that may implement one or more embodiments of the invention.

The pointing device 160 may include one or more mechanisms that may provide spatial (e.g., continuous, multi-dimensional) data that may be input into computing device 100. The data may include, for example, coordinates of various points in a display that is displayed by output device 170. The pointing device may contain switches that may be used to specify various preferences. For example, the pointing device 160 may be a computer mouse that includes switches that may enable a user to point, click, and drag items in a display. Movements of the pointing device may be echoed on the display by movements of a pointer, cursor, and/or other visual changes. Examples of pointing device 160 may include, but are not limited to, a computer mouse, trackball, gyroscopic device (e.g., gyroscope), mini-mouse, touch pad, stylus, graphics tablet, touch screen, joystick (isotonic or isometric), pointing stick, accelerometer, palm mouse, foot mouse, puck, eyeball controlled device, finger mouse, light pen, light gun, eye tracking device, steering wheel, yoke, jog dial, space ball, directional pad, dance pad, soap mouse, haptic device, tactile device, and discrete pointing device.

The output device 170 may include one or more mechanisms that may output information from the computing device 100. The output device 170 may include logic that may be directed by, for example, the processing logic 120, to output the information from the computing device 100. The information may be presented in the form of a display that may be displayed by the output device. The information may include, for example, graphical user interface (GUI) elements (e.g., windows, widgets, etc.), a graphical block diagram of a model, text, or other information. The output device 170 may include, for example, a cathode ray tube (CRT), plasma display device, light-emitting diode (LED) display device, liquid crystal display (LCD) device, vacuum florescent display (VFD) device, surface-conduction electron-emitter display (SED) device, field emission display (FED) device, haptic device, tactile device, printer, speaker, video projector, multi-dimensional display device, or other output device.

The communication interface 180 may include logic configured to interface the computing device 100 with, for example, a communication network and enable the computing device 100 to communicate with entities connected to the network. An example of a network that may be used with computing device 100 will be described further below with respect to FIG. 8.

The communication interface 180 may include a transceiver-like mechanism that enables the computing device 100 to communicate with the entities connected to the network. The communication interface 180 may be implemented as a built-in network adapter, network interface card (NIC), Personal Computer Memory Card International Association (PCMCIA) network card, card bus network adapter, wireless network adapter, Universal Serial Bus (USB) network adapter, modem or other device suitable for interfacing the computing device 100 to the network.

The primary storage 130 is accessible to the processing logic 120 via bus 190. The primary storage 130 may comprise one or more computer-readable media configured to store information for processing logic 120. The information may include computer-executable instructions and/or data that are configured to implement operating system (OS) 132, windows manager (WM) 134, and modeling environment (ME) 200. The instructions may be executed, interpreted, and/or otherwise processed by processing logic 120.

The primary storage 130 may comprise a RAM that may include RAM devices configured to store information (e.g., data, executable instructions). The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (FeRAM) devices, magneto-resistive RAM (MRAM) devices, phase change memory RAM (PRAM) devices, or other types of RAM devices.

OS 132 may be a conventional operating system that may be configured to implement various conventional operating system functions. These functions may include, for example, scheduling one or more portions of ME 200 to run on the processing logic 120, managing the primary storage 130, controlling access to various components associated with the computing device 100 (e.g., pointing device 160, output device 170, network interface 180, secondary storage 150), and controlling access to data received/transmitted by these components. Examples of operating systems that may be adapted to implement OS 132 include the Linux operating system, Microsoft Windows operating system, the Symbian operating system, and the Android operating system. A version of the Linux operating system that may be used is Red Hat Linux available from Red Hat Corporation, Raleigh, N.C. Versions of the Microsoft Windows operating system that may be used include the Microsoft Windows Vista and Microsoft Windows XP operating systems available from Microsoft Inc., Redmond, Wash.

WM 134 may be a conventional window manager that enables graphical user interface (GUI) elements, such as widgets, to be managed in a display that may be displayed by output device 170. The WM 134 may also be configured to (1) capture one or more positions of the pointing device 160 and/or other data associated with pointing device 160, and (2) provide the positions and/or data to OS 132 and/or ME 200. The positions and/or data may be provided, for example, in messages that are sent to the OS 132 and/or ME 200. Examples of window managers that may be used with one or more embodiments of the invention include, but are not limited to, the X windows manager (e.g., GNOME, KDE), which is often used with the Linux operating system, and window managers used with the Microsoft XP and Vista operating systems. It should be noted that other window managers or components that are configured to implement various functions associated with window managers may be used with one or more embodiments of the invention.

ME 200 may be a modeling environment (e.g., a graphical modeling environment, textual modeling environment) that may be configured to implement one or more embodiments of the invention. Some or all of ME 200 may operate under the control of OS 132.

Figure 2:
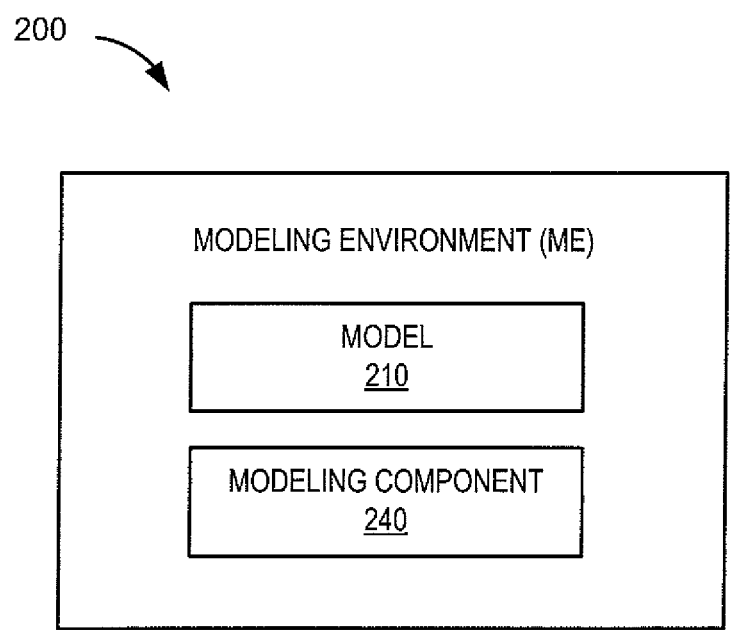
FIG. 2 illustrates an example of a modeling environment (ME) that may be configured to implement one or more embodiments of the invention.

FIG. 2 illustrates an example implementation of ME 200. Referring to FIG. 2, the ME 200 may comprise various components including model 210 and modeling component 240. ME 200 may be configured to, among other things, construct, compile, execute, and interpret model 210.

The ME 200 may include hardware-based and/or software-based logic configured to provide a computing environment that may allow, for example, a user to perform tasks related to disciplines, such as, but not limited to, mathematics, science, engineering, medicine, business, biology, finance, and so on. The ME 200 may include a dynamicallytyped programming language (e.g., the MATLAB® M language) that can be used to express problems and/or solutions in mathematical notations.

For example, the ME 200 may use an array as a basic element, where the array may not require dimensioning. The array may be used to support array-based programming where an operation can apply to an entire set of values included in the array. Array-based programming may allow array-based operations to be treated as a high-level programming technique that may allow, for example, operations to be performed on whole aggregations of data without having to resort to explicit loops of individual non-array operations.

In addition, the ME 200 may be configured to perform matrix and/or vector formulations that may be used for data analysis, data visualization, application development, simulation, modeling, and/or algorithm development. These matrix and/or vector formulations may be used in many areas, such as statistics, image processing, signal processing, control design, life sciences modeling, discrete event analysis and/or design, state-based analysis and/or design, and so on.

The ME 200 may further provide mathematical functions and/or graphical tools or blocks (e.g., for creating plots, surfaces, images, volumetric representations, or other representations). The ME 200 may provide these functions and/or tools using toolboxes (e.g., toolboxes for signal processing, image processing, data plotting, and/or parallel processing). In addition, the ME 200 may provide these functions as block sets. The ME 200 may also provide these functions in other ways, such as via a library, local or remote database, and so on.

The ME 200 may include a graphical-based environment. The ME 200 may include provisions configured to create, compile, execute, and/or interpret models, such as model 210. A model may be graphical and may be executable (e.g., an executable block diagram model).

Examples of MEs that may incorporate one or more embodiments of the invention include, but are not limited to, MATLAB®, Simulink®, Stateflow®, and SimEvents®, which are available from The MathWorks, Inc.; Unified Modeling Language (UML); profiles associated with UML (e.g., Modeling Analysis and Real-Time Embedded Systems (MARTE), Systems Modeling Language (SysML), Avionics Architecture Description Language (AADL), etc.); GNU Octave from the GNU Project; MATRIXx and LabView® from National Instruments; Mathematica from Wolfram Research, Inc.; Mathcad from Mathsoft Engineering & Education Inc.; Maple from Maplesoft; Extend from Imagine That, Inc.; Scilab and Scicos from The French Institution for Research in Computer Science and Control (INRIA); Modelica or Dymola from Dynasim AB; VisSim from Visual Solutions; SoftWIRE from Measurement Computing Corporation; WiT from DALSA Coreco; VEE Pro and SystemVue from Agilent Technologies, Inc.; Vision Program Manager from PPT Vision, Inc.; Khoros from Khoral Research, Inc.; VisiQuest from Pegasus Imaging Corporation; Gedae from Gedae, Inc.; Virtuoso from Cadence Design Systems, Inc.; Rational Rose, Rhapsody and Tau from International Business Machines (IBM), Inc.; SCADE from Esterel Technologies; and Ptolemy from the University of California at Berkeley.

Model 210 may be, for example, a time-based graphical block diagram model, a state transition diagram, a discrete event model, an activity diagram, a UML diagram, a sequence diagram, a data flow model, or some other type of model or diagram. Model 210 may be configured to represent a system. Model 210 may be graphical, textual, or some combination of graphical and textual. The system represented by model 210 may be dynamic, linear, non-linear, or some other type of system. A dynamic system (either natural or man-made) may be a system whose response at any given time may be a function of its input stimuli, its current state, and a current time. Such systems may range from simple to highly complex systems. Natural dynamic systems may include, for example, a falling body, the rotation of the earth, bio-mechanical systems (muscles, joints, etc.), bio-chemical systems (gene expression, protein pathways), weather, and climate pattern systems. Examples of man-made or engineered dynamic systems may include, for example, a bouncing ball, a spring with a mass tied on an end, automobiles, airplanes, control systems in major appliances, communication networks, audio signal processing, nuclear reactors, and a stock market.

The system represented by model 210 may have various execution semantics that may be represented in model 210 as a collection of modeling elements, often referred to as blocks. A block may generally refer to a portion of functionality that may be used in the model 210. The block may be graphically represented, however, it can be appreciated that the block does not necessarily need to be represented graphically. For example, the block may be represented textually or stored in some form of internal representation. Also, a particular visual depiction used to represent the block, for example in a graphical block diagram, may be generally an arbitrary design choice.

A block may be hierarchical in that the block itself may comprise one or more blocks that make up the block. A block comprising one or more blocks (sub-blocks) may be referred to as a subsystem block. A subsystem block may be configured to represent a subsystem of the overall system represented by the model.

Modeling component 240 may contain computer-executable instructions and data that are configured to perform various tasks including (1) constructing model 210, for example, through a GUI; (2) allowing an augmentation of a pre-defined set of blocks with custom user-specified blocks that may be associated with model 210; (3) using model 210 to compute and trace a temporal evolution of outputs associated with a dynamic system represented by the model 210; and (4) automatically producing, for example, deployable software systems, and descriptions of hardware systems that mimic a behavior of either the entire model 210 or portions of model 210. The blocks may be represented in a graphical representation (e.g., a block diagram) of the model that may be presented by the ME 200 to, for example, a user.

The modeling component 240 may include a block diagram editor and an execution engine (not shown). The block diagram editor may be configured to allow, for example, a user, to specify, edit, annotate, save, publish, and print a block diagram of model 210 comprising one or more blocks.

The execution engine may be configured to enable a computation and/or tracing of a dynamic system's outputs from model 210. The execution engine may carry out the task of compiling and linking the block diagram to produce an "in-memory executable" version of model 210 that may be used for simulating, verifying, generating code, trimming, or linearizing the model 210.

Compiling may include checking an integrity and validity of block interconnections in the block diagram. At this stage, the execution engine may also sort the blocks in the block diagram into hierarchical lists that may be used when creating block execution lists. Linking may include using a result of the compiled stage to allocate memory needed for an execution of the various components of the model 210.

Linking may also include producing block execution lists that are used, for example, by a simulation or linearization of model 210. Included within the link stage may be an initialization of model 210 which may include an evaluating of "setup" methods (e.g. block start, initialize, enable, and constant output methods). The block execution lists may be generated because the simulation and/or linearization of the model 210 may execute block methods by type (not by block) when they have a sample hit.

Figure 3:
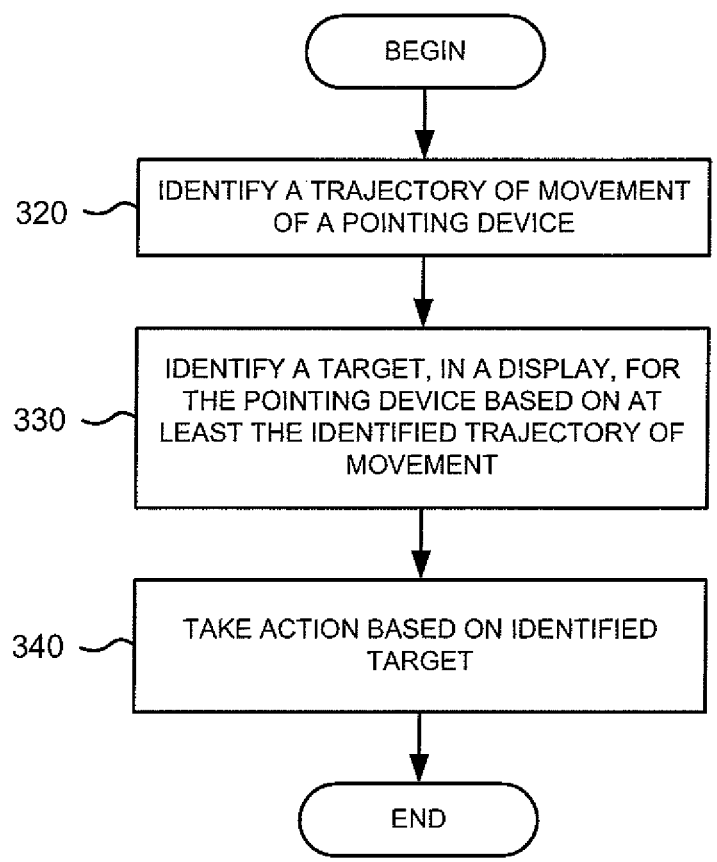
FIG. 3 illustrates a flowchart of example acts that may be used to identify a target of a pointing device based on at least a trajectory of movement of the pointing device.

FIG. 3 illustrates a flowchart of example acts that may be used to identify a target for a pointing device, such as pointing device 160, based on at least a trajectory of movement of the pointing device. Referring to FIG. 3, at block 320, a trajectory of movement of the pointing device is identified. As will be described further below, the trajectory of movement may be identified from one or more captured positions of the pointing device. Moreover, the trajectory of movement may be identified in other ways. For example, if the pointing device contains a sensor, such as a strain gauge, the trajectory of movement may be identified from readings (data) of the sensor.

At block 330, a target for the pointing device is identified based at least on the identified trajectory. The target may be a GUI element that is displayed in a display. For example, as will be described further below, the target may be a tooltip window that is displayed in response to selecting an entry displayed in a function browser window. The tooltip window may be identified as a target for the pointing device given that at least the identified trajectory indicates that the tooltip window is in a path associated with the identified trajectory of movement of the pointing device.

Note that the identified target for the pointing device may be a target location in a display. A GUI element may or may not be displayed at the identified target location. Some action may be taken based on the identified target location. For example, a GUI element (e.g., a cascaded menu) may be displayed in response to identifying the target location.

Also note that criteria, other than or in addition to the identified trajectory of movement, may be used to identify the target. For example, the criteria may include a velocity of movement of the pointing device, acceleration of the pointing device, deceleration of the pointing device, or other kinematic-based criteria that may be identified from captured movements of the pointing device. Some combination of magnitude and direction may be taken into consideration when identifying the target using, for example, acceleration and/or deceleration criteria. In addition, a history of movement of the pointing device may be kept and used as criteria. For example, a history of movement may be kept for a particular user and used to develop a profile for the user. The profile may be used as criteria. Some combination of the above criteria may be used to identify the target for the pointing device.

At block 340, an action may be taken based on identifying the target. For example, as noted above, a cascaded menu may be displayed in response to identifying the target. Other examples may include altering a display to indicate the target, keeping a GUI element displayed in response to identifying the GUI element as the target, etc.

Figure 4A:
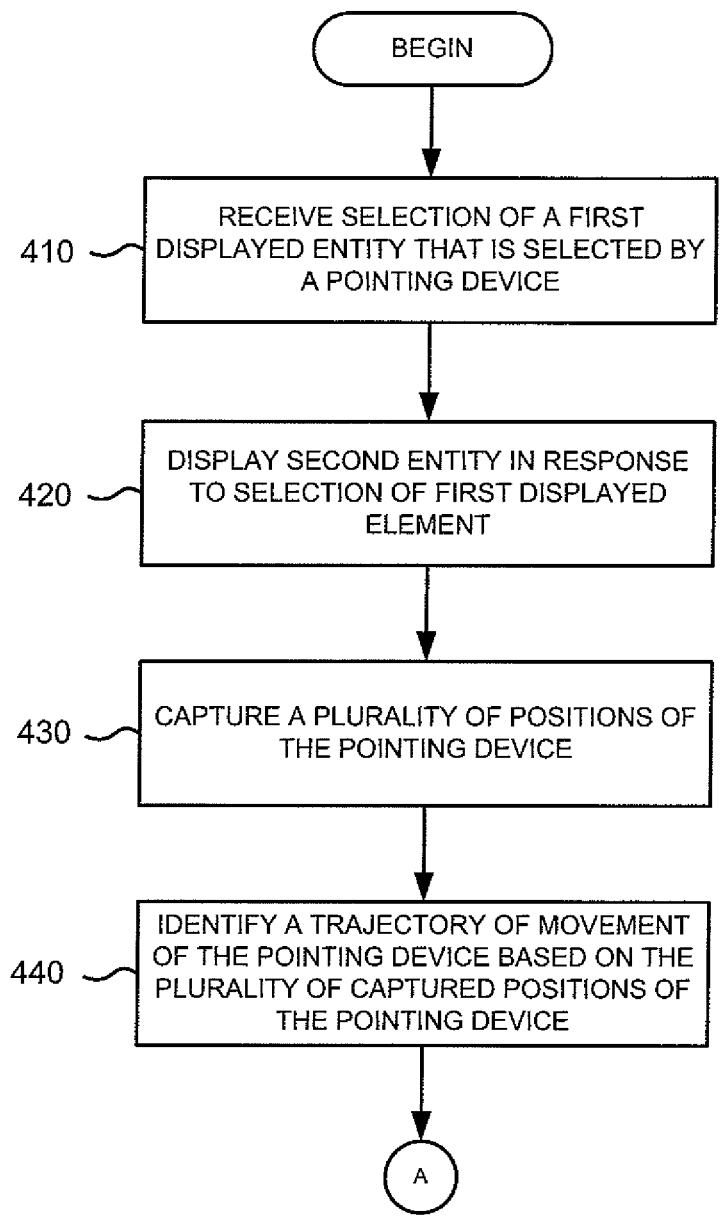
FIGS. 4A-B illustrate a flowchart of example acts that may be used to identify whether a displayed entity is a target of a pointing device based on at least a trajectory of movement of the pointing device.
Figure 4B:
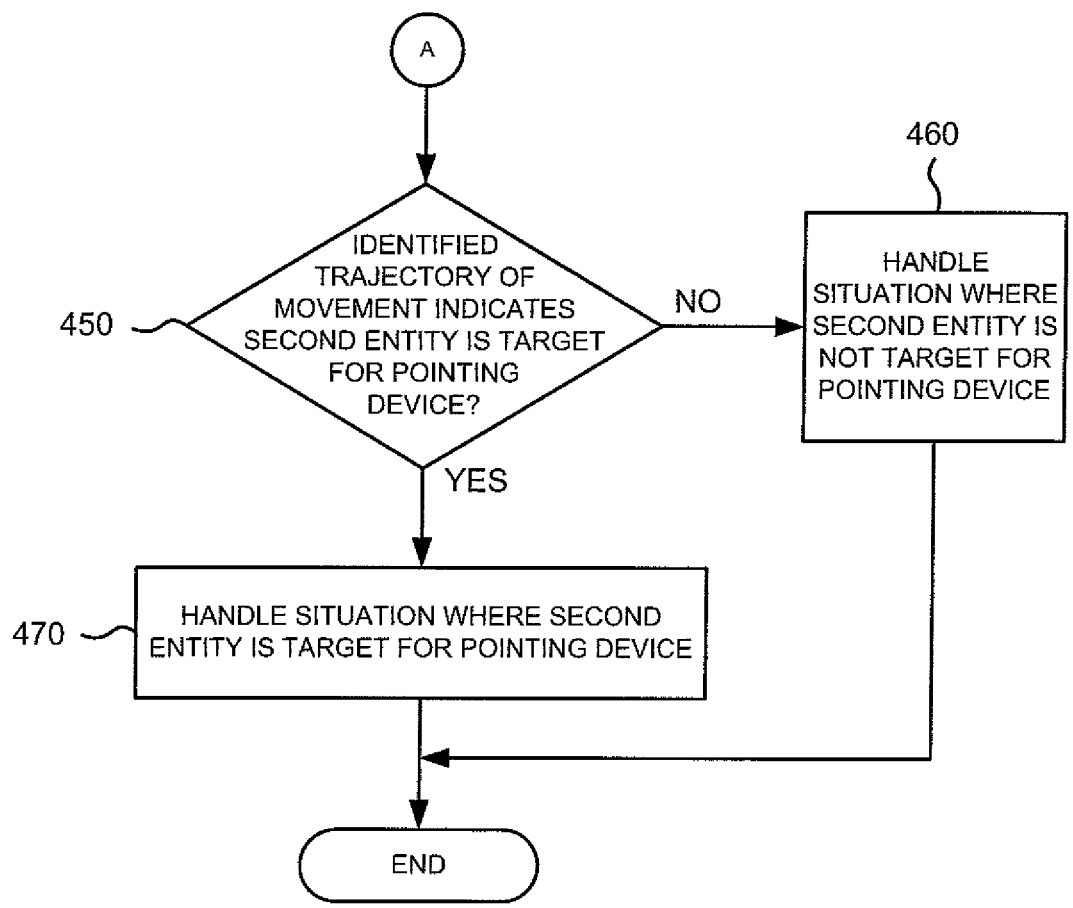

FIGS. 4A-B illustrate a flowchart of example acts that may be used to identify whether a displayed entity is a target of a pointing device based on at least a trajectory of movement of the pointing device.

Referring to FIG. 4A, at block 410, a selection is received of a first displayed entity. For example, the first displayed entity may be a name of a software function associated with a model. The name may be displayed in a GUI element (e.g., a window) that implements a function browser. The function browser may be configured to enable a user to obtain information about software functions associated with the model. The name may be in a displayed list of names provided by the function browser. The user may select the name in order to obtain information about the software function. The selection may be made using a pointing device, such as pointing device 160, and received by a computing device, such as computing device 100.

At block 420, a second entity is displayed in response to the selection of the first displayed entity. Using the above example, the second entity may be a tooltip that may be displayed in response to selecting the name of the software function. The tooltip may provide information about the software function. This information may include, for example, a description of the software function, a description of parameters associated with the software function, a description of how to call the software function, etc. Note that the second entity may be some other element, such as, for example, text, a menu, a sub-menu, a context menu, a window, a button, an image, a graphical block in a graphical block diagram, a widget, or some other user interface component.

At block 430, a plurality of positions of the pointing device is captured. The positions may be captured by a window manager, such as WM 134. The window manager may provide the captured positions to an operating system, such as OS 132, and/or a modeling environment, such as ME 200, in a series of messages. Note, that the modeling environment, operating system, or some other entity may capture the positions without involving the window manager.

At block 440, a trajectory of movement of the pointing device is identified from the plurality of captured positions. The trajectory may be identified from the captured positions by calculating the trajectory using the captured device positions as point data along a path taken by the pointing device. In an embodiment, the trajectory may be calculated by identifying a slope of a trajectory path using the captured device positions.

At block 450 (FIG. 4B), the identified trajectory of the movement of the pointing device is checked to determine if it indicates the second entity is the target of the pointing device. As will be described further below, this check may involve determining whether the trajectory falls within certain bounds associated with the second entity. Here, if the trajectory falls within the bounds, the second entity may be identified as the target for the pointing device.

At block 460, if the trajectory does not indicate that the second entity is the target for the pointing device, processing may be performed to handle this situation. For example, in the above example, this situation may be handled by no longer displaying the tooltip, graying out the tooltip, fading the tooltip, and/or otherwise altering the tooltip to indicate that it is not the identified target.

At block 470, if the trajectory indicates that the second element is the target for the pointing device, processing may be performed to handle this situation. This processing may include keeping the tooltip displayed, and/or altering the display of the tooltip to indicate that it is the identified target.

Figure 5:
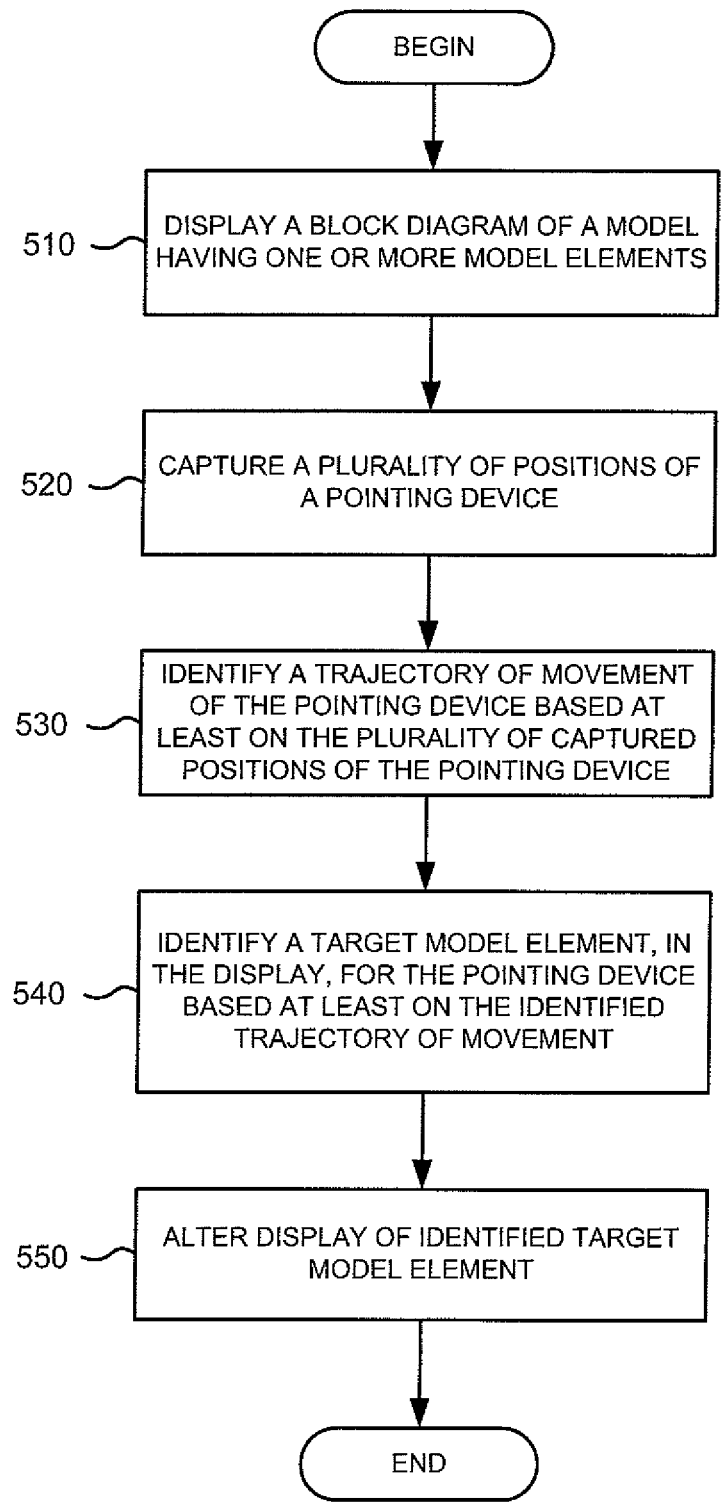
FIG. 5 illustrates a flowchart of example acts that may be used to (1) identify a target, in a display of a graphical block diagram, of a pointing device based on at least an identified trajectory of the pointing device and (2) alter the display of the target.

FIG. 5 illustrates a flowchart of example acts that may be used to (1) identify a target, in a display of a graphical block diagram, of a pointing device based on at least an identified trajectory of the pointing device and (2) alter the display of the target.

Referring to FIG. 5, at block 510, a block diagram having one or more model elements (e.g., blocks) is displayed in a display. The display may be displayed by an ME, such as ME 200, on an output device, such as output device 170. At block 520, a plurality of positions of a pointing device is captured. The positions may be captured as described above.

At block 530, a trajectory of movement of the pointing device is identified based at least on the plurality of captured positions of the pointing device. The trajectory may be identified as described above. At block 540, based at least on the identified trajectory, a target model element, displayed in the block diagram, for the pointing device is identified. The target model element may be identified as described above.

At block 550, the display of the target model element is altered. As noted above, altering may include coloring the element, highlighting the element, changing the size of the element, changing the dimensional appearance of the element, flashing the element, changing the intensity of the element, etc.

Figure 6A:
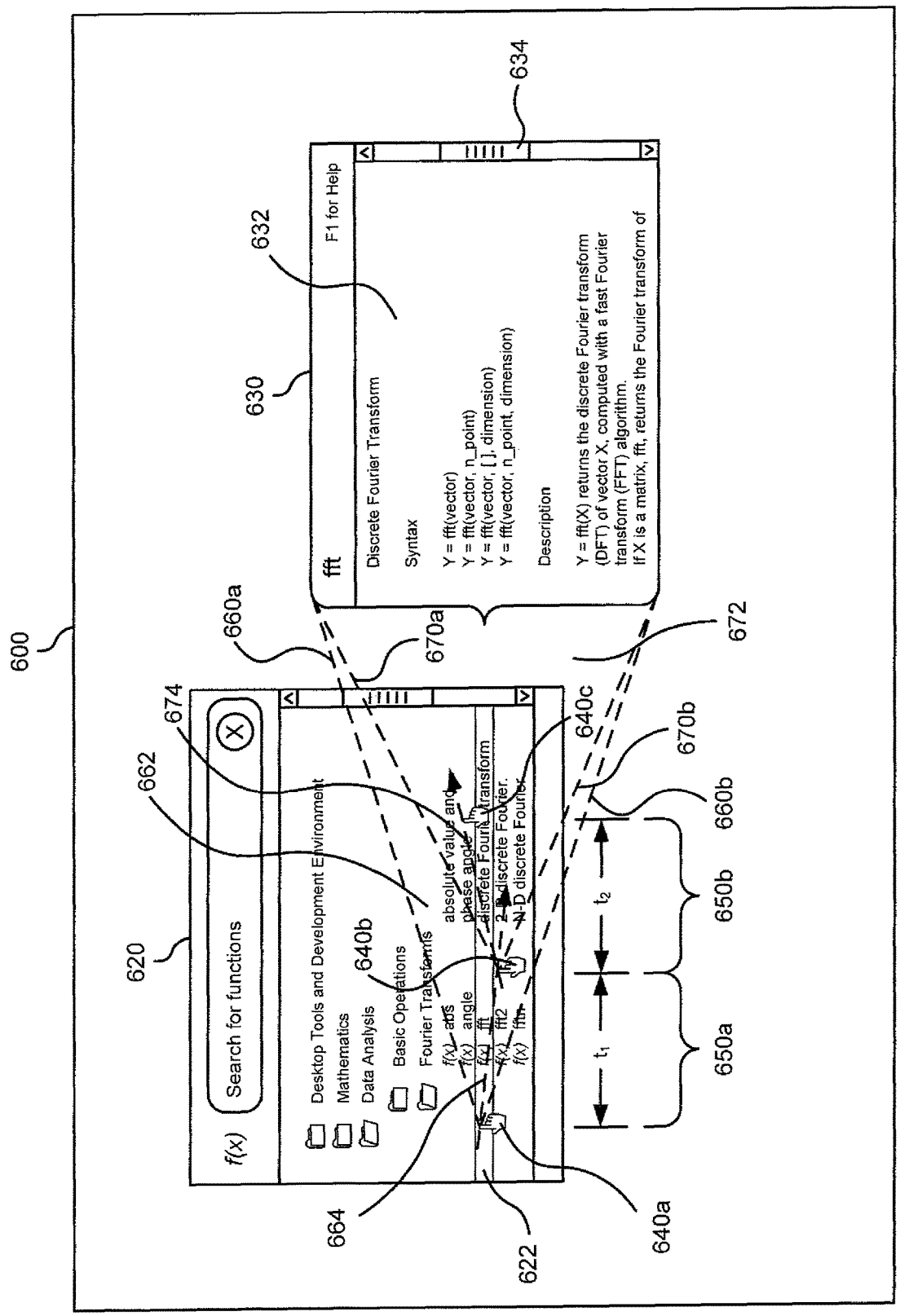
FIGS. 6A-B illustrate an example display, which includes a function browser window and a tooltip window.
Figure 6B:
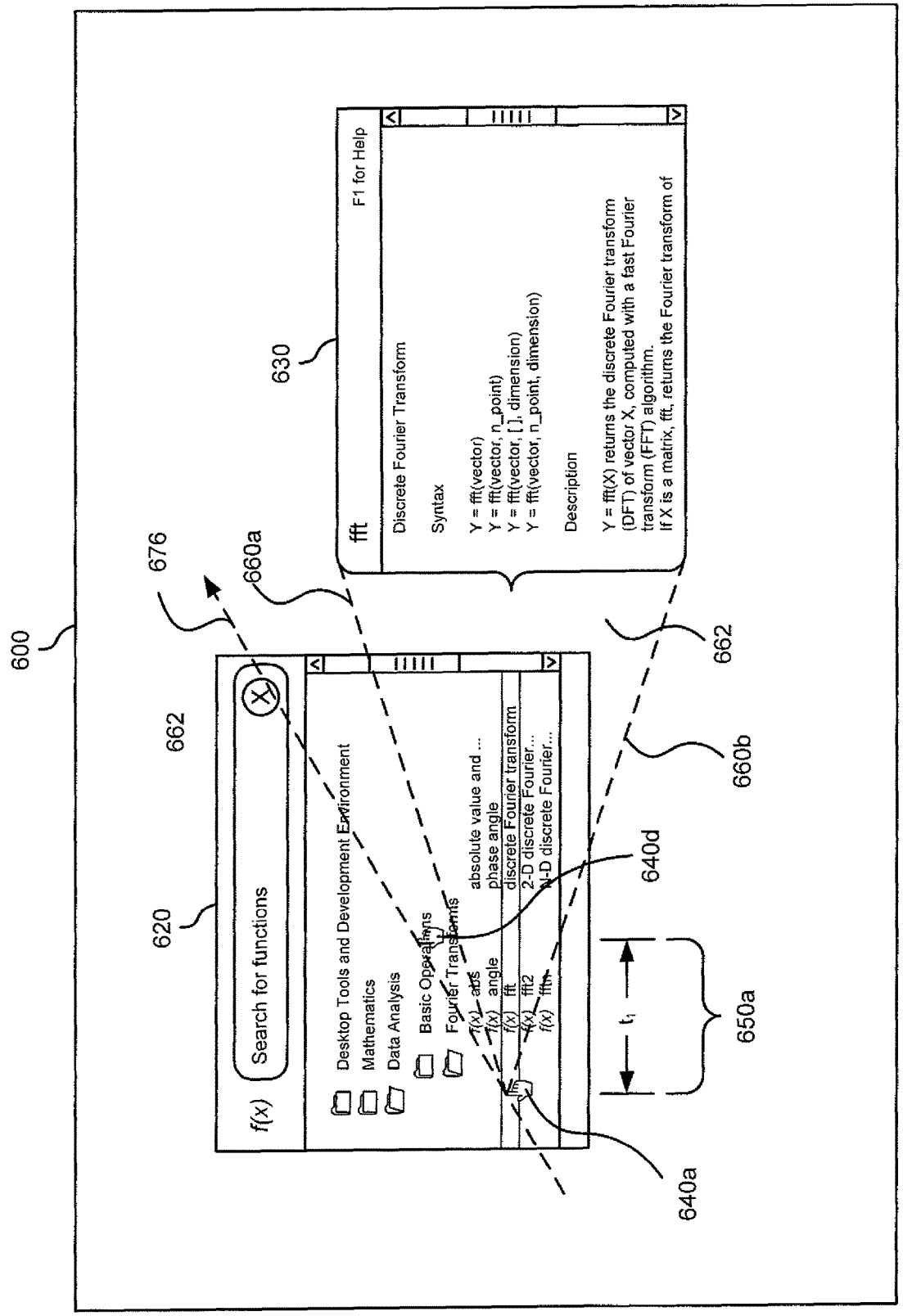

Following are a few examples that may be helpful in further explaining the above. FIGS. 6A-B illustrate an example display 600, which includes a function browser window 620 and a tooltip window 630. The display 600 may be presented, for example, to a user via output device 170. Cursors 640a-c indicate captured positions of pointing device 160.

The function browser window 620 allows functions associated with ME 200 to be browsed by a user. Browsing may enable the user to select a function to obtain information about the function. Information about a function may include, for example, input/output parameters associated with the function and a brief description of what the function does. The information may be presented to the user in tooltip window 630.

Referring to FIG. 6A, function "fft" has been selected in the browser window 620. The function may be selected by positioning the pointing device 160 such that a cursor 640, associated with the pointing device 160, is positioned in a region 622 associated with the function. Tooltip window 630 displays information 632 about the selected function. The information 632 may include syntax associated with various ways to call the function and a brief description of the function. The tooltip window 630 may be displayed in response to the "fft" function being selected in the browser window 620.

The tooltip window 630 includes a scroll bar widget 634, which may be used to scroll the information 632. In this example, in order to use the scroll bar 634 the pointing device 160 must first be positioned such that the cursor 640 is in the tooltip window 630. The scroll bar 634 may be selected by positioning the pointing device 160 such that the cursor 640 is placed over the scroll bar 634. Alternatively, the pointing device 160 may contain a scroll wheel that may be used to operate the scroll bar 634 after the cursor is in the tooltip window 630.

In display 600, cursors 640a, 640b, and 640c represent captured first, second, and third positions of the pointing device 160, respectively. Time "$t_1$" 650a represents an interval of time between when the first position is captured and the second position is captured. Likewise, time "$t_2$" 650b represents a time interval between when the second position is captured and the third position is captured.

Line 664 represents a trajectory of movement of the pointing device 190 that may be identified based on the captured first and second positions. As can be seen, the trajectory of movement 664 indicates that the pointing device 160 is being positioned in the direction of the tooltip window 630.

Lines 660a-b may be used to delineate a range of movement 662 for the pointing device 160 with respect to identifying the tooltip window 630 as a target for the pointing device 160. Provided that the trajectory of movement 664 lies within the range of movement 662 bounded by lines 660a-b, the tooltip window 630 is identified as the target for the pointing device 160. The range of movement 662 may be identified after the first position 640a has been captured.

After the second position 640b is captured, a second range of movement 672 delineated by lines 670a-b may be identified. After the third position is captured, a second trajectory of movement 674 of the pointing device 160 may be identified. A check may be performed to determine whether this trajectory 674 is within the second range of movement 672. Assuming the trajectory 674 is within the second range of movement 672, the tooltip window 630 may continue to be identified as the target for the pointing device 160. The above may be repeated until the pointing device 160 is positioned such that the cursor 640 is within the tooltip window 630.

Referring now to FIGS. 1, 2, 4A-B, and 6A, pointing device 160 may be used to select the "fft" function (first displayed entity) in the browser window 620. This selection may be received by ME 200 (block 410). Specifically, display 600 may be displayed on output device 170. A user may position pointing device 160 to a first position as indicated by cursor 640a. The first position may be received by the processing logic 120 via bus 110 and forwarded to the OS 132. The OS 132, in turn, may forward the first position to WM 134, which may convert the first position to coordinate data that is placed in one or more messages. The messages may be sent to ME 200. ME 200 may identify, based on the messages, that the pointing device 160 is positioned to select the "fft" function in window 620.

In response to the selection, ME 200 may display tooltip window 630 (block 420). The pointing device may be positioned to a second position as indicated by cursor 640b. The second position may be captured by WM 134 during time interval 650a and forwarded to ME 200 (block 430). ME 200 receives the second position and uses it along with first position to identify a trajectory of movement 664 of the pointing device 160 based on the first and second positions (block 440). In addition, ME 200 may (1) identify area 662 and (2) check whether the identified trajectory is within the area 662 (block 450). Since the trajectory 664 is within area 662, the tooltip window 630 is identified as a target for the pointing device 160. This situation may be handled by continuing to display the tooltip window 630 (block 470). Note that the above may be repeated for other captured positions of the pointing device 160. For example, the above may be repeated for the second position and a third position (indicated by cursor 640c) where trajectory 674 is identified from the second and third captured positions and it is determined that the trajectory lies within the second range of movement 672, thus, the tooltip window 630 continues to be the identified target for the pointing device 160.

FIG. 6B illustrates a situation where a second captured position (indicated by cursor 640d) of the pointing device 160 falls outside area 662 and thus the tooltip window 630 is no longer considered an identified target for the pointing device 160. Specifically, referring to FIG. 6B, suppose that the second captured position 640d is captured during time $t_1$ 650 and trajectory of movement 676 of the pointing device 160 is identified based on captured positions 640a and 640d. As can be seen, trajectory of movement 676 lies outside the area 662 bounded by lines 660a and 660b. Thus, the trajectory of movement 676 indicates that the tooltip window 630 is not a target for the pointing device 160. This situation may be handled differently than the situation where the tooltip window 630 is identified as a target for the pointing device 160, as described above. Here, since tooltip window 630 is determined to not be the target for the pointing device 160 this situation may be handled by no longer displaying the tooltip window 630 (block 460). Note that other techniques may be employed to handle this situation.

Figure 7A:
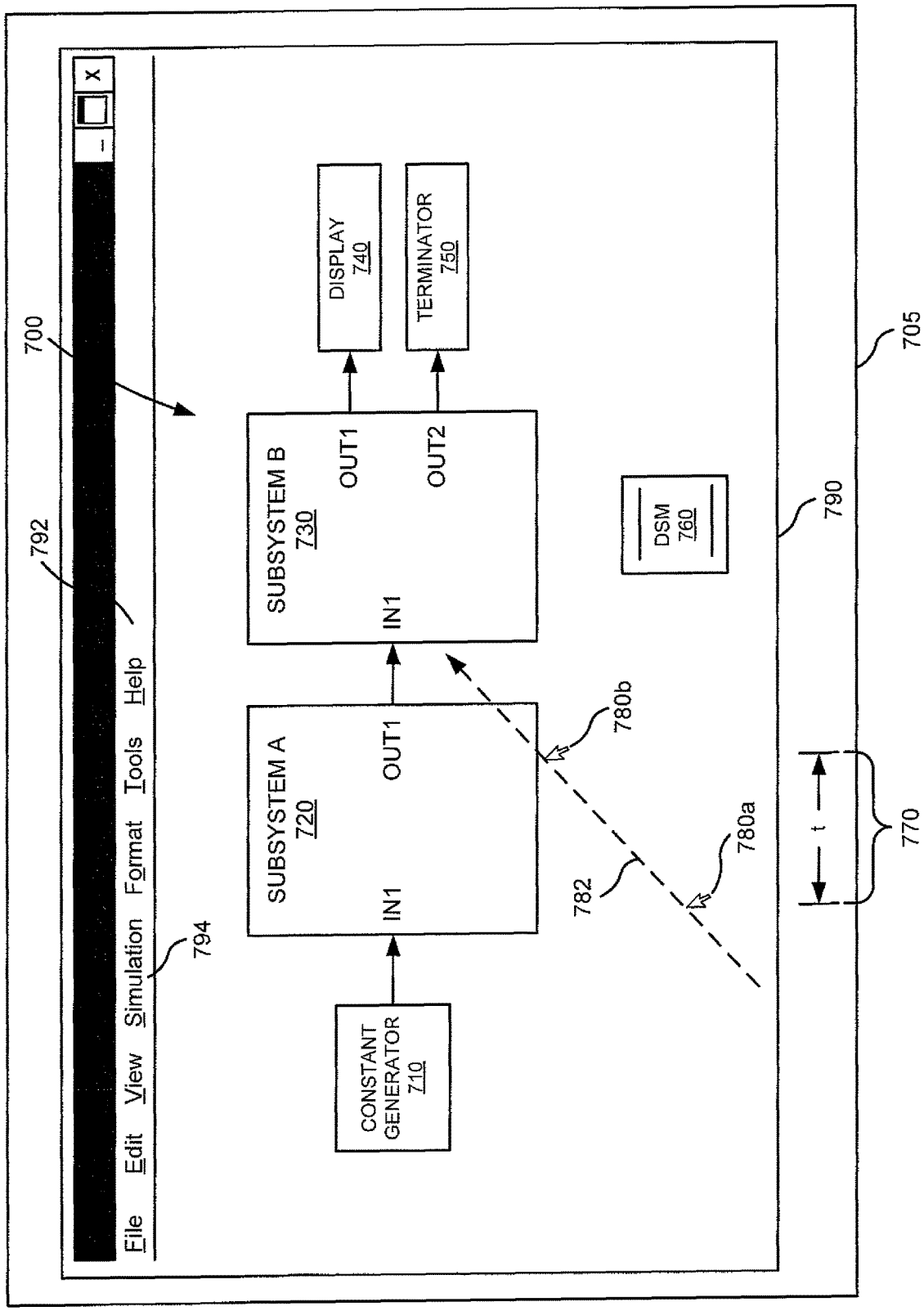
FIGS. 7A-C illustrate an example display, which includes a block diagram of a model.
Figure 7B:
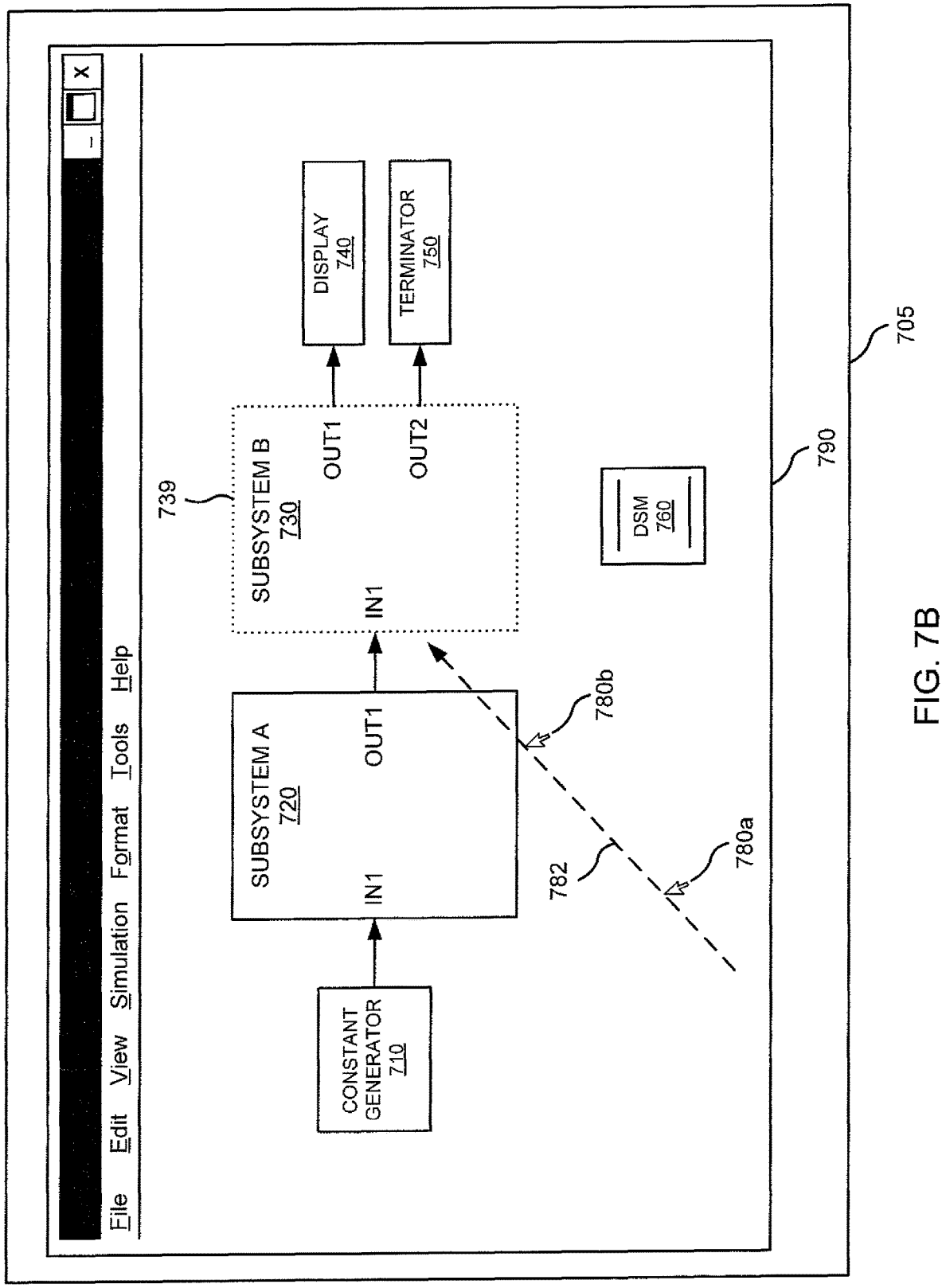
Figure 7C:
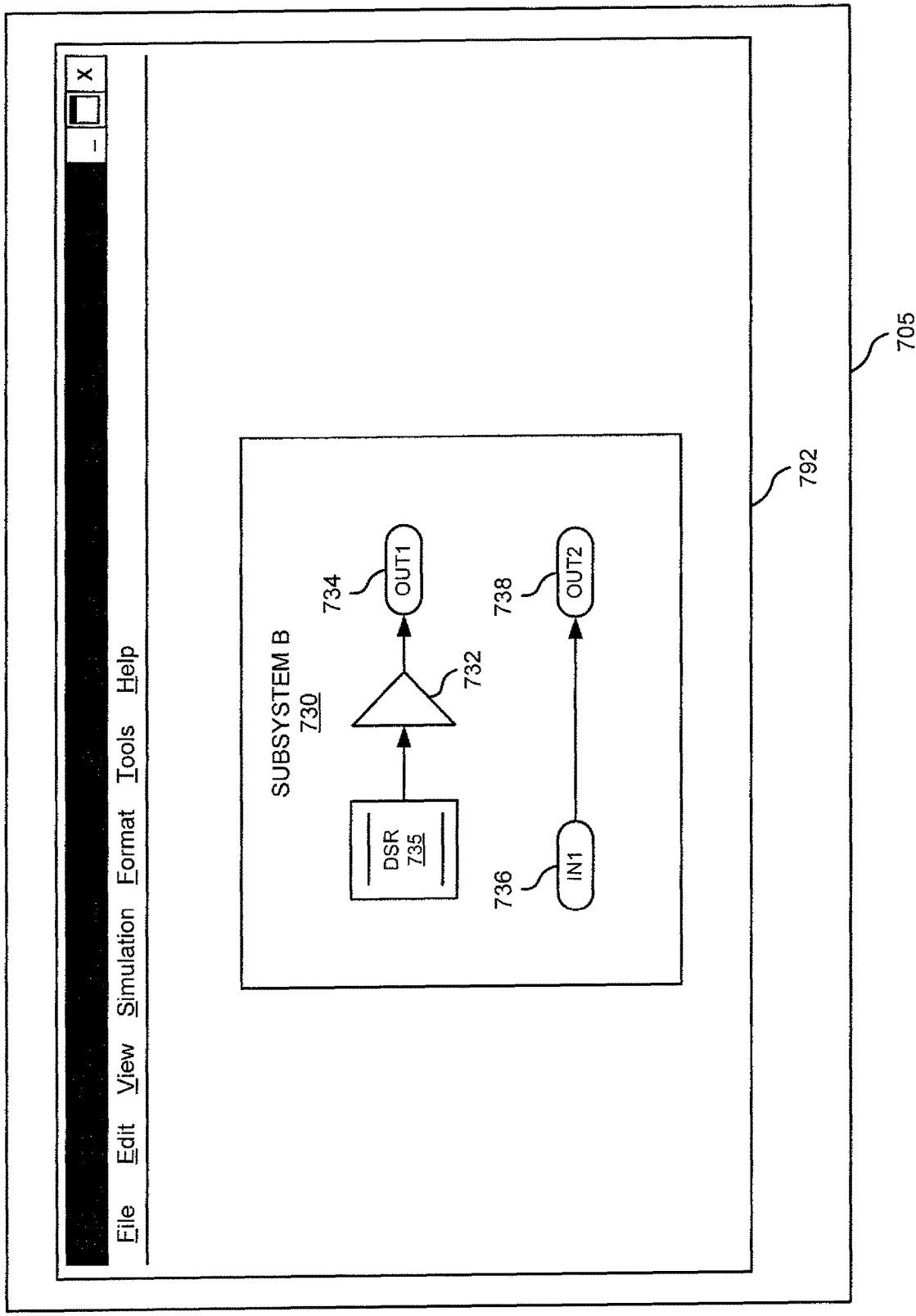

FIGS. 7A-C illustrate an example display 705, which includes a block diagram of a model 700. Referring to FIG. 7A, a user may interact with model 700 through a graphical window 790 that may be provided by the ME 200. Graphical window 790 may provide an interface through which commands relating to model 700 may be entered. For example, graphical window 790 may include a menu bar 792 that may allow the user to select various menus. A menu may contain one or more menu items that when selected may perform various functions. For example, menu bar 792 contains a "simulation" menu 794 which may include a menu item (not shown) that when selected may start a simulation of model 700. It should be noted that other techniques may be used to perform functions related to model 700. For example, a command line interface may be provided, e.g., in a separate window (not shown), that enables commands relating to the model 700 to be entered. The commands when entered may perform various functions associated with the model 700, as described above.

Model 700 includes a constant generator block 710, a first subsystem (subsystem A) block 720, a second subsystem (subsystem B) block 730, a display block 740, a terminator block 750 and data store memory (DSM) block 760. The constant generator block 710 may be configured to generate a constant value that may be input into of subsystem A 720. Subsystem A 720 may include a series of blocks (not shown) configured to implement the subsystem 720. Likewise, subsystem B 730 may include a series of blocks (not shown) configured to implement the subsystem 720. More details of subsystem B 730 will be discussed further below with respect to FIG. 7C. DSM block 760 may be configured to provide a data store memory for model 700.

Cursors 780a and 780b indicate a first captured position and a second captured position, respectively, of pointing device 160 during the time interval "t" 770. The positions may be captured as described above. A trajectory of movement 782 of the pointing device 160 may be identified based on the captured positions and a target for the pointing device 160 may be identified based on the identified trajectory of movement 782, as described above.

Referring now to FIGS. 1, 2, 5, and 7A, block diagram 700 may be displayed in window 790 by ME 200 (block 510). A plurality of positions 780a-b of the pointing device 160 may be captured, as described above, and received by ME 200 (block 520). ME 200 may identify trajectory of movement 782 of the pointing device 160 based on the captured plurality of positions 780a-b (block 530). ME 200 may identify subsystem B 730 as a target in the block diagram model 700 for the pointing device 160 based at least on the identified trajectory of movement 782.

Referring now to FIG. 7B, the display of subsystem B 730 has been altered to indicate that it is the identified target for the pointing device 160 (block 550). Specifically, the border of subsystem B 730 has been changed to indicate that it is the identified target. Note that other alterations may be made to the display of subsystem B 730 to indicate that it is the identified target. For example, as described above, the display may be altered to highlight block 730, display the block 730 in a different size (e.g., enlarge or shrink the block 730), display the block 730 in a particular color, changing the dimensional appearance of the block 730 (e.g., display the block with additional or fewer dimensions shown), changing the intensity of the block 730, flashing the block 730, etc.

Alternatively or in addition to the above, a display may be altered to show various aspects of the target. For example, FIG. 7C illustrates a window 792 that contains blocks that may be part of subsystem B 730. The window 792 may be displayed instead of or in addition to window 790 in display 705.

Figure 8:
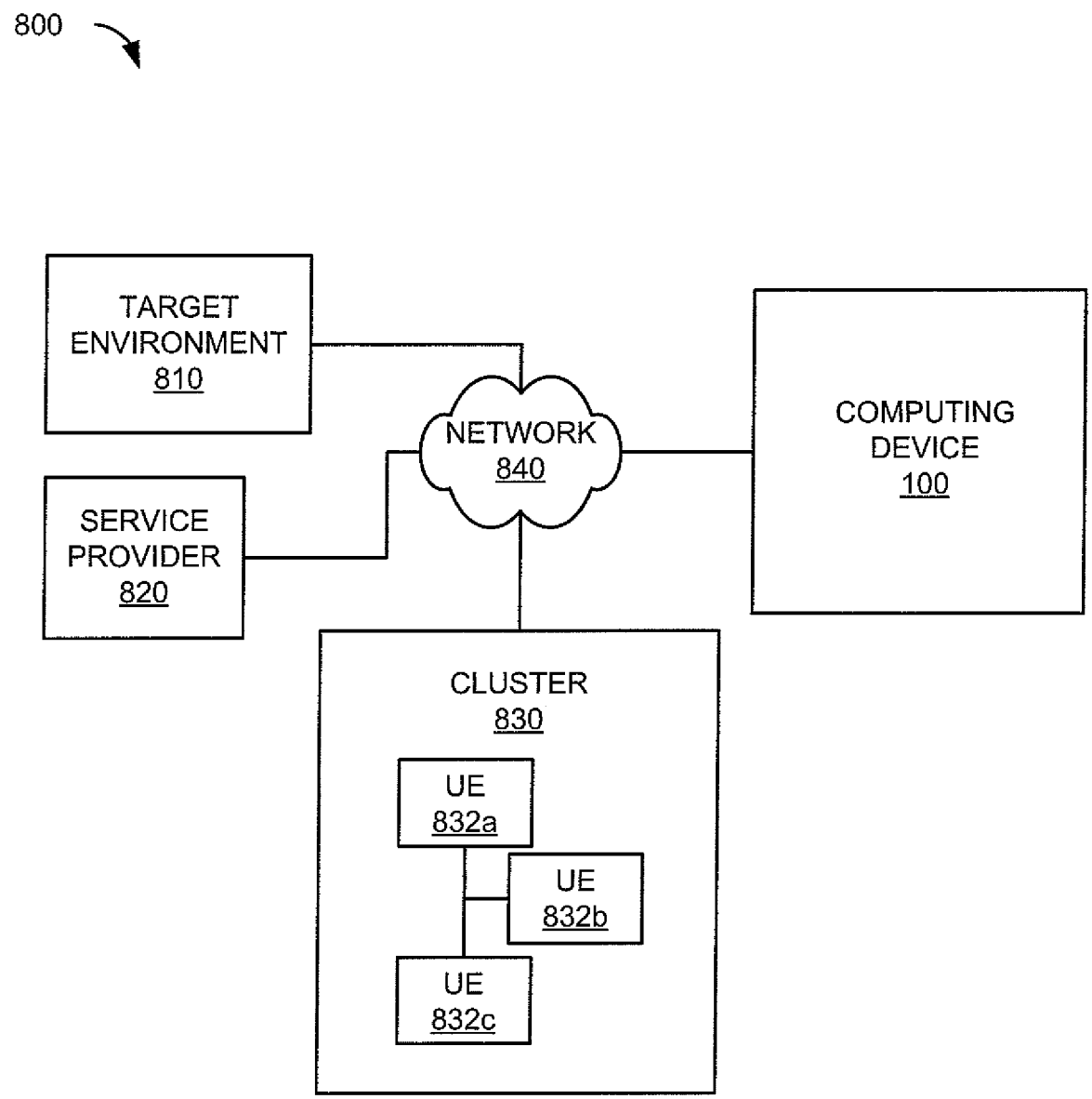
FIG. 8 illustrates an example of a distributed environment that may be configured to implement one or more embodiments of the invention.

One or more embodiments of the invention may be implemented in a distributed environment. FIG. 8 illustrates an example of a distributed environment 800 that may be configured to implement one or more embodiments of the invention. Referring to FIG. 8, environment 800 may contain various entities including computing device 100, target environment 810, service provider 820, cluster 830, and network 840. Note that the distributed environment illustrated in FIG. 8 is just one example of an environment that may be used with embodiments of the invention. Other distributed environments that may be used with embodiments of the invention may contain more entities, fewer entities, entities in arrangements that differ from the arrangement illustrated in FIG. 8, and so on.

Details of computing device 100 were described above with respect to FIG. 1. In distributed environment 800, computing device 100 may be configured to, among other things, exchange information (e.g., data) with other entities (e.g., target environment 810, service provider 820, and cluster 830) in network 840. Computing device 100 may interface with the network 840 via communication interface 180.

The network 840 may include a communication network capable of exchanging information between the entities in the network 840. The network 840 may include digital and/or analog aspects. The information may include machine-readable information having a format that may be adapted for use, for example, in the network 840 and/or with one or more entities in the network 840. For example, the information may be encapsulated in one or more packets that may be used to transfer the information through the network 840.

Information may be exchanged between entities using various network protocols, such as, but not limited to, the Internet Protocol (IP), Asynchronous Transfer Mode (ATM), Synchronous Optical Network (SONET), the User Datagram Protocol (UDP), Transmission Control Protocol (TCP), Institute of Electrical and Electronics Engineers (IEEE) 802.11, etc.

The network 840 may comprise various network devices, such as gateways, routers, switches, firewalls, servers, repeaters, address translators, etc. Portions of the network 840 may be wired (e.g., using wired conductors, optical fibers, etc.) and/or wireless (e.g., using free-space optical (FSO), radio frequency (RF), acoustic transmission paths, etc.). Portions of network 840 may include a substantially open public network, such as the Internet. Portions of the network 840 may include a more restricted network, such as a private corporate network or virtual private network (VPN). It should be noted that implementations of networks and/or devices operating on networks described herein are not limited with regards to information carried by the networks, protocols used in the networks, the architecture/configuration of the networks, etc.

The service provider 820 may include logic (e.g., software) that makes a service available to another entity in the distributed environment 800. The service provider 820 may also include a server operated by, for example, an individual, a corporation, an educational institution, a government agency, and so on, that provides one or more services to a destination, such as computing device 100. The services may include software containing computer-executable instructions that implement one or more embodiments of the invention or portions thereof, and may be executed, in whole or in part, by (1) a destination, (2) the service provider 820 on behalf of the destination, or (3) some combination thereof.

For example, in an embodiment, service provider 820 may provide one or more subscription-based services that may be available to various customers. The services may be accessed by a customer via network 840. The customer may access the services using a computing device, such as computing device 100. The services may include services that implement one or more embodiments of the invention or portions thereof. The service provider 820 may limit access to certain services based on, e.g., a customer service agreement between the customer and the service provider 820.

The service agreement may allow the customer to access the services that may allow the customer to build, execute, and/or analyze a model, such as model 210, as described above. The service agreement may include other types of arrangements, such as certain fee-based arrangements or restricted access arrangements. For example, a customer may pay a fee which provides the customer unlimited access to a given package of services for a given time period (e.g., per minute, hourly, daily, monthly, yearly, etc.). For services not included in the package, the customer may have to pay an additional fee in order to access the services. Still other arrangements may be resource-usage based. For example, the customer may be assessed a fee based on an amount of computing resources or network bandwidth used.

Cluster 830 may include a number of units of execution (UEs) 832 that may perform processing of one or more embodiments of the invention or portions thereof on behalf of computing device 100 and/or another entity, such as service provider 820. The UEs 832 may reside on a single device or chip or on multiple devices or chips. For example, the UEs 832 may be implemented in a single ASIC or in multiple ASICs. Likewise, the UEs 832 may be implemented in a single computing device or multiple computing devices. Other examples of UEs 832 may include FPGAs, CPLDs, ASIPs, processors, multiprocessor systems-on-chip (MPSoCs), graphic processing units, microprocessors, etc.

The UEs 832 may be configured to perform operations on behalf of another entity. For example, in an embodiment, the UEs 832 are configured to execute portions of code associated with the ME 200. Here, the ME 200 may dispatch certain activities pertaining to one or more embodiments of the invention to the UEs 832 for execution. The service provider 820 may configure cluster 830 to provide, for example, the above-described services to computing device 100 on a subscription basis (e.g., via a web service).

It should be noted that one or more embodiments of the invention may be implemented in environments other than an ME. For example, one or more embodiments of the invention may be implemented in an operating system, such as OS 132, a window manager, such as WM 134, an application, a driver, and so on. Moreover, one or more embodiments of the invention may be adapted to operate in environments that may be multidimensional (e.g., 2-D, 3-D, etc.).

The foregoing description of embodiments is intended to provide illustration and description, but is not intended to be exhaustive or to limit the invention to the precise form disclosed. Modifications and variations are possible in light of the above teachings or may be acquired from practice of the invention. For example, while a series of acts has been described above with respect to FIGS. 3, 4A-B, and 5, the order of the acts may be modified in other implementations. Further, non-dependent acts may be performed in parallel.

Also, the term "user", as used herein, is intended to be broadly interpreted to include, for example, a computing device (e.g., a workstation) or a user of a computing device, unless otherwise stated.

It will be apparent that embodiments, described herein, may be implemented in many different forms of software and hardware. Software code and/or specialized hardware used to implement embodiments described herein is not limiting of the invention. Thus, the operation and behavior of embodiments were described without reference to the specific software code and/or specialized hardware—it being understood that one would be able to design software and/or hardware to implement the embodiments based on the description herein.

Further, certain embodiments of the invention may be implemented as "logic" that performs one or more functions. This logic may be hardware-based, software-based, or a combination of hardware-based and software-based. The logic may be stored in one or more computer-readable storage media and may include computer-executable instructions for execution by processing logic, such as processing logic 120. The computer-executable instructions may be configured to implement one or more embodiments of the invention. The computer-readable storage media may be volatile or non-volatile and may include, for example, flash memories, removable disks, non-removable disks, and so on.

In addition, it should be noted that various electromagnetic signals, such as wireless signals, electrical signals carried over a wire, optical signals carried over optical fiber, etc., may be encoded to carry data and/or computer-executable instructions, configured to implement one or more embodiments of the invention, on, for example, a communication network, such as network 840.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. One or more non-transitory computer-readable media storing executable instructions for execution by processing logic, one or more of the executable instructions for:
    identifying a first trajectory of a movement, of a cursor, controlled by a pointing device based on a plurality of captured positions of the cursor, the first trajectory of the movement of the cursor including a direction of the movement of the cursor;
    identifying a first entity that is a first target of the pointing device based on at least the identifying of the first trajectory, the first entity being displayed in a display device;
    displaying a second entity associated with the first target in the display device in response to the identifying of the first entity as the first target of the pointing device, wherein the first entity and the second entity are different entities;

while displaying the cursor, the first entity, and the second entity together in the display device based on the identifying of the first entity as the first target of the pointing device:

determining if a second trajectory of the movement of the cursor falls within bounds that define an area associated with the second entity in the display device, and in response to determining that the second trajectory of the movement of the cursor falls within the bounds that define the area associated with the second entity in the display device, continuing to display the second entity in the display device, or in response to determining that the second trajectory of the movement of the cursor does not fall within the bounds that define the area associated with the second entity in the display device, altering an appearance of the second entity in the display device to indicate that the second entity is not a second target of the pointing device.

2. The one or more non-transitory computer-readable media of claim 1 further comprising the one or more executable instructions for:

continuing a display in the display device of the first entity in response to the identifying of the first entity as the first target of the pointing device.

3. The one or more non-transitory computer-readable media of claim 1 wherein the plurality of positions of the cursor are captured by a window manager.

4. The one or more non-transitory computer-readable media of claim 1 further comprising the one or more executable instructions for:

identifying a velocity of the movement of the cursor based on the plurality of captured positions, wherein the first entity is identified as the first target of the pointing device based on at least the first trajectory and the identified velocity of the movement of the cursor.

5. The one or more non-transitory computer-readable media of claim 1 further comprising one or more executable instructions for:

altering an appearance of the first entity in the display device to indicate that the first entity is the first target of the pointing device.

6. The one or more non-transitory computer-readable media of claim 5 wherein the appearance of the first entity is altered in size in order to indicate that the first entity is the first target of the pointing device.

7. The one or more non-transitory computer-readable media of claim 5 wherein the appearance of the first entity is altered in at least one of a color, a flashing, an intensity, a highlighting, or a dimensional appearance to indicate that the first entity is the first target of the pointing device.

8. The one or more non-transitory computer-readable media of claim 1 wherein the pointing device is at least one of a mouse, a stylus, a touch screen, a joystick, a pointing stick, a touch pad, a trackball, an accelerometer, a haptic device, or a tactile device.

9. The one or more non-transitory computer-readable media of claim 1 wherein the first entity is at least one of text, a tooltip, a menu selection, a sub-menu selection, a window, a button, or a graphical block in a graphical block diagram.

10. The one or more non-transitory computer-readable media of claim 1 further comprising the one or more executable instructions for:

identifying a history of the movement of the cursor, and wherein the first entity is identified based on at least the first trajectory and the identified history of the movement of the cursor.

11. The one or more non-transitory computer-readable media of claim 1 wherein altering the appearance of the second entity in the display device to indicate that the second entity is not the second target includes one of: removing the second entity from the display device, graying the second entity, and fading the second entity.

12. A method, comprising:

identifying, using processing logic, a first trajectory of a movement of a cursor controlled by a pointing device based on a plurality of captured positions of the cursor, the first trajectory of the movement of the cursor including a direction of the movement of the cursor;

identifying a first entity that is a first target of the pointing device based on at least the identifying of the first trajectory, the first entity being displayed in a display device;

displaying a second entity associated with the first target in the display device in response to the identifying of the first entity as the first target of the pointing device, wherein the first entity and the second entity are different entities;

while displaying the cursor, the first entity, and the second entity together in the display device based on the identifying of the first entity as the first target of the pointing device:

determining if a second trajectory of the movement of the cursor falls within bounds that define an area associated with the second entity in the display device, and in response to determining that the second trajectory of the movement of the cursor falls within the bounds that define the area associated with the second entity in the display device, continuing to display the second entity in the display device, or in response to determining that the second trajectory of the movement of the cursor does not fall within the bounds that define the area associated with the second entity in the display device, altering an appearance of the second entity in the display device to indicate that the second entity is not a second target of the pointing device.

13. The method of claim 12 further comprising:

continuing a display in the display device of the first entity in response to the identifying of the first entity as the first target of the pointing device.

14. The method of claim 12 wherein the plurality of positions of the cursor are captured by a window manager.

15. The method of claim 12 further comprising:

identifying a velocity of the movement of the cursor based on the plurality of captured positions, wherein the first entity is identified as the first target of the pointing device based on at least the first trajectory and the identified velocity of the movement of the cursor.

16. An apparatus, comprising:

processing logic configured to:

identify a first trajectory of movement, of a cursor, controlled by a pointing device based on a plurality of captured positions of the cursor, the first trajectory of the movement of the cursor including a direction of the movement of the cursor;

identify a first entity that is a first target of the pointing device based on at least the identifying of the first trajectory, the first entity being displayed in a display device;

display a second entity associated with the first target in the display device in response to the identifying of the first entity as the first target of the pointing device, wherein the first entity and the second entity are different entities;

while displaying the cursor, the first entity, and the second entity together in the display device based on the identifying of the first entity as the first target of the pointing device, the processing logic further configured to:

determine if a second trajectory of the movement of the cursor falls within bounds that define an area associated with the second entity in the display device, and continue to display the second entity in the display device in response to determining that the second trajectory of the movement of the cursor falls within the bounds that define the area associated with the second entity in the display device, or alter an appearance of the second entity in the display device to indicate that the second entity is not a second target of the pointing device in response to determining that the second trajectory of the movement of the cursor does not fall within the bounds that define the area associated with the second entity in the display device.

17. The apparatus of claim 16 wherein the processing logic is further configured to:

continue a display in the display device of the first entity in response to the identifying of the first entity as the first target of the pointing device.

18. The apparatus of claim 16 wherein the plurality of positions of the cursor are captured by a window manager.

19. The apparatus of claim 16 wherein the processing logic is further configured to:

identify a velocity of the movement of the cursor based on the plurality of captured positions, wherein the first entity is identified as the first target of the pointing device based on at least the first trajectory and the identified velocity of the movement of the cursor.

20. The apparatus of claim 16 wherein the pointing device is at least one of a mouse, a stylus, a touch screen, a joystick, a pointing stick, a touch pad, a trackball, an accelerometer, a haptic device, or a tactile device.

21. The one or more non-transitory computer-readable media of claim 1, wherein the first entity and the second entity do not overlap in the display.

22. The one or more non-transitory computer-readable media of claim 1, wherein the first entity, the second entity, and the mouse are different objects in the display device.

* * * * *